US012180038B2

(12) United States Patent
Bastelli

(10) Patent No.: US 12,180,038 B2
(45) Date of Patent: Dec. 31, 2024

(54) SAFE ELEVATOR SHAFT AND CAR ROOF ACCESS

(71) Applicant: INVENTIO AG, Hergiswil (CH)

(72) Inventor: Joseph Bastelli, Greenwood Village, CO (US)

(*) Notice: Subject to any disclaimer, the term of this patent is extended or adjusted under 35 U.S.C. 154(b) by 1315 days.

(21) Appl. No.: 16/649,935

(22) PCT Filed: Sep. 20, 2018

(86) PCT No.: PCT/EP2018/075470
§ 371 (c)(1),
(2) Date: Mar. 23, 2020

(87) PCT Pub. No.: WO2019/063407
PCT Pub. Date: Apr. 4, 2019

(65) Prior Publication Data

US 2020/0223663 A1 Jul. 16, 2020

(30) Foreign Application Priority Data

Sep. 27, 2017 (EP) .................................... 17193432

(51) Int. Cl.
*B66B 5/00* (2006.01)
*B66B 1/34* (2006.01)
(Continued)

(52) U.S. Cl.
CPC .......... *B66B 5/0087* (2013.01); *B66B 1/3461* (2013.01); *B66B 1/468* (2013.01);
(Continued)

(58) Field of Classification Search
CPC ..... B66B 5/0087; B66B 1/3461; B66B 1/468; B66B 5/16; B66B 9/00; B66B 2201/4653
See application file for complete search history.

(56) References Cited

U.S. PATENT DOCUMENTS

2006/0289244 A1* 12/2006 Sittler ................. B66B 11/0246 187/401
2018/0134521 A1* 5/2018 Beauchaud ............... B66B 1/28

FOREIGN PATENT DOCUMENTS

CN 1414921 A 12/2004
CN 203740833 U 7/2014
(Continued)

OTHER PUBLICATIONS

International Search Report for International Application No. PCT/EP2018/075470 dated Jan. 1, 2019.

*Primary Examiner* — Jeffrey Donels
(74) *Attorney, Agent, or Firm* — Knobbe, Martens, Olson & Bear, LLP

(57) ABSTRACT

In an elevator installation subject to maintenance by a technician, a drive system is operated to move an elevator car along an elevator shaft in response to a call entered by the technician on a first floor. The drive system is deactivated in response to a control signal generated by an elevator controller when a safety circuit of the elevator is interrupted. Interrupting the safety circuit is caused by a detector mounted on the elevator car detecting a signal transmitted by a service tool. The service tool is introduced into a receptacle of a shaft door at the first floor. After deactivation of the drive system the moving of the elevator car comes to a halt with its roof being at a level to allow the technician to step on top of the roof from the first floor.

15 Claims, 4 Drawing Sheets

(51) Int. Cl.
*B66B 1/46* (2006.01)
*B66B 5/16* (2006.01)
*B66B 9/00* (2006.01)

(52) U.S. Cl.
CPC .................. *B66B 5/16* (2013.01); *B66B 9/00* (2013.01); *B66B 2201/4653* (2013.01)

(56) References Cited

FOREIGN PATENT DOCUMENTS

| | | | | |
|---|---|---|---|---|
| EP | 1845053 | B1 | | 10/2007 |
| EP | 2927174 | A1 | | 10/2015 |
| EP | 3153446 | A1 | * | 4/2017 |
| JP | H07285752 | A | | 10/1995 |
| JP | H09255247 | A | | 9/1997 |
| JP | 2000072361 | | | 3/2000 |
| JP | 2001163540 | A | | 6/2001 |
| JP | 2003002548 | A | | 1/2003 |
| WO | WO200380495 | A1 | | 10/2003 |
| WO | WO 2016/207683 | | | 12/2016 |

* cited by examiner

SAFE ELEVATOR SHAFT AND CAR ROOF ACCESS

TECHNICAL FIELD

The present disclosure of various embodiments generally relates to maintaining and servicing elevator installations. More particularly, the various embodiments described herein relate to an elevator system, a method for enabling a technician to safely access an elevator shaft and a top of a car roof, and a service tool for an elevator installation.

SUMMARY

From time to time, a technician or other authorized person may have to access an elevator shaft (or hoistway) to perform maintenance, service or repair of an elevator installation or its components from within the elevator shaft. Shaft access typically occurs via a landing or shaft door that the technician can open using an unlocking key while standing on a floor (landing). At least for elevators installed in the USA, the unlocking key, also referred to as drop key, typically has an elongated body, e.g., a rod-shaped form, that is sized to be inserted into a keyhole at a discrete location of the shaft door. Once inserted, the technician manipulates the key to unlock a locking mechanism of the shaft door.

As the unlocking key may unlock a shaft door and allow the shaft door to be opened even if no elevator car is present on that floor, the safety of the person opening the shaft door, whether authorized or un-authorized, is of utmost concern. Various approaches for providing such safety are known: WO 2016/207683 A1, for example, discloses an unlocking key having an authorization device, and a detection device detecting the presence of the authorization device. If the detection device detects a key without an authorization device, the shaft door's lock cannot be unlocked. This is intended to allow only authorized access. Another approach is disclosed in JP2000072361; it uses a receiver on a sill of a landing to detect a beam emitted from a projector on a sill of an elevator car. When the beam is detected, the elevator is at the floor, and a shutter in a key hole is opened allowing insertion of an unlocking key. This is intended to ensure that the shaft door can only be opened when the car is behind the shaft door.

JP2001163540A discloses that a function operating switch is provided in a landing door. A distance from a first ceiling position at which an elevator car usually stops at a landing to a second position at which the ceiling is equal to a floor from where a maintenance and inspection person is allowed to move between the floor and the ceiling of the car is stored as a distance data in a memory of a controller. When the function operating switch is turned on, the elevator car is automatically moved to the second position.

Even though these approaches generally improve the safety by allowing shaft access only with an authorized key or when a car is present behind the shaft door to be opened, these approaches may not be suitable for the various situations a technician may encounter when performing maintenance. For example, a technician's safety must also be provided once shaft access is obtained by means of an authorized key. Further, a technician may be required to open a shaft door even if no car is present at that floor. There is, therefore, a need for an alternative technology that further improves upon the safety of a technician while being more suitable for the various work situations.

Accordingly, one aspect of such an improved technology involves a method of operating an elevator installation for maintenance by a technician, wherein the technician is required to stand on top of a roof of an elevator car. A drive system is operated to move the elevator car along an elevator shaft in response to a call entered by the technician on a first floor. The drive system is deactivated in response to a control signal generated by an elevator controller when a safety circuit of the elevator installation is interrupted. Interrupting the safety circuit is caused by a detector mounted on the elevator car detecting a signal transmitted by a service tool and having an intensity value that is about equal to a predetermined threshold value. The service tool is introduced into a receptacle of a shaft door at the first floor. After deactivation of the drive system the moving of the elevator car comes to a halt with its roof being at a level to allow the technician to step on top of the roof from the first floor.

Another aspect involves an elevator installation having an elevator controller, a drive system, an elevator car, a safety circuit coupled to the elevator controller, and a detector. The elevator car is coupled to the drive system and movable under control of the controller within an elevator shaft between floors of a building. A shaft door is provided on each floor and includes a receptacle to receive a service tool of a technician. The detector is mounted at the elevator car and coupled to the safety circuit. The elevator controller is configured to operate the drive system to move the elevator car along the elevator shaft in response to a call entered by the technician on a first floor, and to deactivate the drive system in response to a control signal generated by the elevator controller when the safety circuit is interrupted. Interrupting the safety circuit is caused by the detector detecting a signal transmitted by the service tool positioned at the receptacle of the shaft door of the first floor and having an intensity value that is about equal to a predetermined threshold value. After deactivation of the drive system the moving of the elevator car comes to a halt with a roof being at a level to allow the technician to step on top of the roof from the first floor.

A further aspect involves an elevator service tool for use in connection with the above-mentioned method and elevator installation. The service tool has a housing having an elongated part and a grip part. A processor, a battery, and an indicator equipment are arranged within the grip part, and a transducer is arranged at a distal end of the elongated part.

The technology described herein provides that the elevator car comes to a halt so that its roof is at a level that allows the technician to step on top of the roof from the floor where the technician is standing. The elevator car stops there without further action by the technician, and—for improved safety—before the technician opens the shaft door. It is a further advantage that the level at which the roof comes to a halt does not need to be very precise; the technician may need to make a smaller or larger step.

The technology described herein provides further the option to retrofit an existing elevator installation at a relatively low cost and requiring minimal modifications. These modifications include mounting the detector at the elevator car and connecting it to the installation's safety circuit. The technician brings the service tool to the elevator installation to be serviced, and inserts it according to one embodiment into the receptacle that is used to unlock the shaft door. As such, the service tool serves to unlock the shaft door and to provide the signal used to determine when to interrupt the safety circuit. In one embodiment, a modification of the shaft door is not necessary, in particular in elevator installations where the receptacle is arranged on a door panel of the shaft door.

The technology can be adapted to a defined maintenance protocol the technician is required to follow. In one embodiment, the drive system moves the elevator car from the first floor downwards. In that case, the detector is preferably mounted on or close to the roof to receive the signal transmitted by the service tool when moving downwards; the detected signal intensity decreases with increasing distance from the service tool. For example, the drive system may move the elevator car from the first floor downwards towards a second floor below the first floor.

In one embodiment, the drive system moves the elevator car in response to a car call entered by the technician from within the elevator car. This ensures that the maintenance procedure begins while the elevator installation is at a defined and safe state. Also, the maintenance procedure can be started from any floor as long as the elevator car can be moved at least one floor up or down. Due to such flexibility, the technician is not bound to start the maintenance procedure at a defined floor.

In one embodiment, interrupting the safety circuit occurs at substantially the same time the detector detects that the intensity value of the transmitted signal is about equal to the predetermined threshold value. In another embodiment, interrupting the safety circuit occurs with a predetermined delay time after the detector detects that the intensity value of the transmitted signal is about equal to the predetermined threshold value. These options facilitate determining the timing when to trigger the braking of the elevator stop so that it stops at the desired level.

The detector may be mounted on the roof or at a side wall in proximity to the roof. In another embodiment, the detector may be mounted at a bottom of the elevator car or at a side wall in proximity to the bottom. Such flexibility can facilitate retrofitting existing elevator installations where space and suitable locations may be limited.

In one embodiment, the transducer includes one of an IR signal transmitter, a laser transmitter, an ultrasonic signal transmitter, and an RF signal transmitter. Depending on the kind of transmitter, the detector is configured to detect an IR signal, a laser signal, an ultrasonic signal, or an RF signal. These options allow the technology to be optimized for a particular situation of an existing elevator installation (e.g., regarding prevailing distance between elevator car and shaft door).

As to the service tool, it is an advantage that it may be equipped with components depending on the foreseen use of the service tool. For example, in one embodiment, the service tool may have a strain gauge arranged on or within the elongated part to detect rotation of service tool by the technician, or it may have an RF transceiver arranged within the grip part to communicate with a device external to the service tool

BRIEF DESCRIPTION OF THE DRAWINGS

The novel features and characteristics of the technology are set out in the claims below. The various embodiments of the technology, however, as well as other features and advantages thereof, are best understood by reference to the detailed description, which follows, when read in conjunction with the accompanying drawings, wherein:

DETAILED DESCRIPTION

Figure 1:
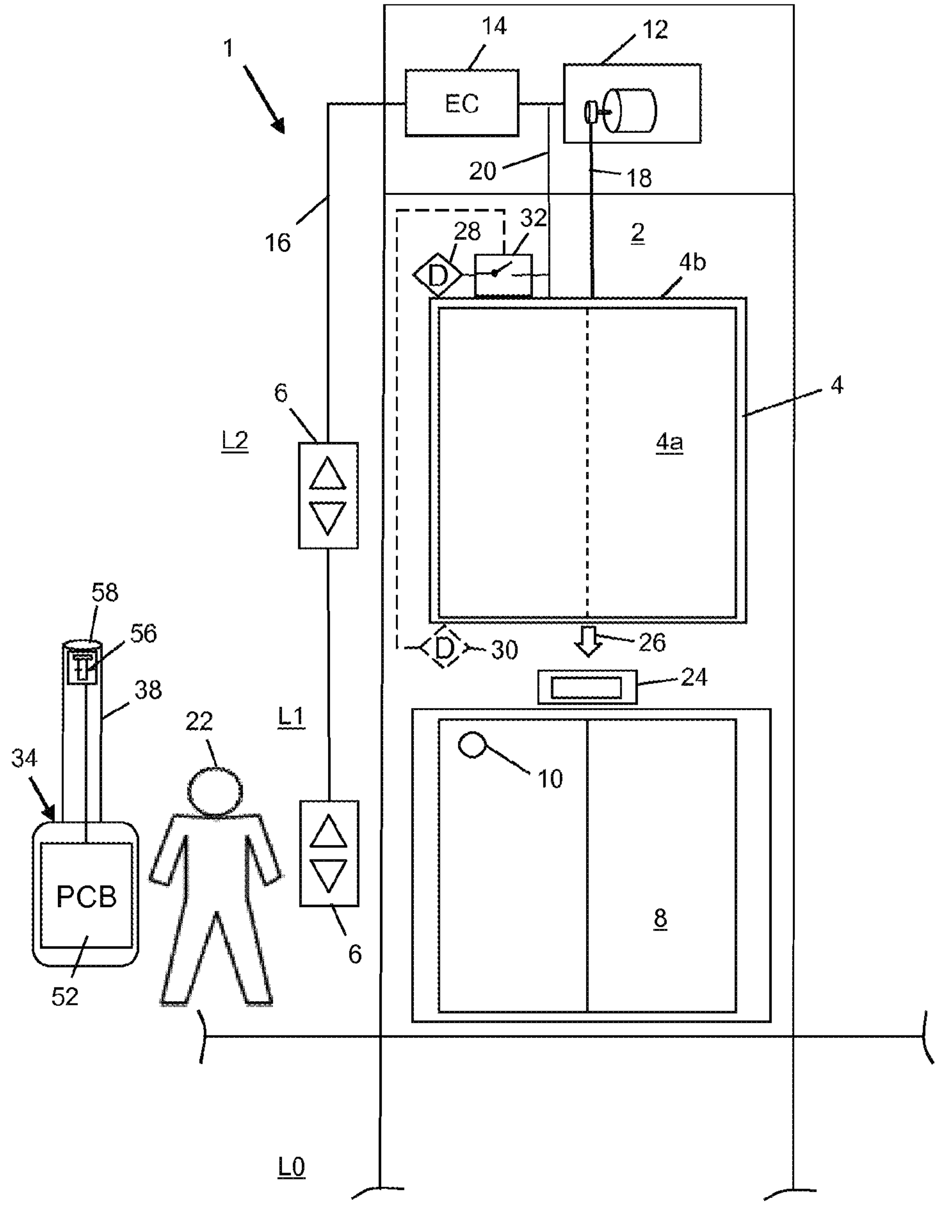
FIG. 1 shows a schematic illustration of an exemplary elevator installation subject to maintenance by a technician having a service tool, wherein the elevator installation is in a first state.

FIG. 1 is a schematic illustration of an exemplary elevator installation 1 subject to maintenance by a mechanic or technician 22, wherein the elevator installation 1 is in a first state. The elevator installation 1 is installed in a building which may be an apartment building, an office building, a commercial/shopping center, a hotel, a sports arena, an airport terminal, a ship, or any other structure suitable for a person to reside or stay for a longer period of time. The exemplary building shown in FIG. 1 is used herein to describe various embodiments of the technology; it has several floors L0, L1, L2, each one providing access to an elevator car 4 that is movable within an elevator shaft 2. The floor L0 may be a lobby or a basement of the building. Although the building shown in FIG. 1 has three floors L0, L1, L2, it is contemplated that the building may generally have a plurality of floors. It is further contemplated that the elevator installation 1 includes several elevator cars 4, which may be organized in one or more elevator groups.

On floor L1, the technician 22 is illustrated as being located next to a locked and closed shaft door 8, and equipped with a service tool 34. As described below in more detail, the service tool 34 has several functions: according to one function, it allows the technician 22 to unlock the shaft door 8 so that the technician 22 can manually open the shaft door 8, and, according to another function, it enables stopping the elevator car 4 responding to a call by the technician 22 so that the technician 22 can safely and conveniently step on top of a roof 4*b* of the elevator car 4 to perform maintenance from within the elevator shaft 2. In view of the first function, i.e., the unlocking function, the service tool 34 may be referred to as a key, e.g., an unlocking key.

The receptacle 10 is located at a discrete or inconspicuous area of the shaft door 8, and shaped to receive a part of the service tool 34. The shaft door 8 includes at least one door panel and a door frame. In one embodiment, the receptacle 10 is a circular hole sized to receive an elongated part 38 of the service tool 34. In FIG. 1, the receptacle 10 is provided near an upper edge of the door panel. It is contemplated that in another embodiment the receptacle 10 may be provided at other locations of the shaft door 8. Within the shaft door 8 and actuatable via the receptacle 10, a locking mechanism is provided to lock the shaft door 8 when no elevator car 4 is present. Various locking mechanism are known to the skilled person, see, e.g., EP1845053B1 or WO200380495A1.

To unlock the shaft door 8, the technician 22 inserts the service tool 34 and, for example, rotates it to act upon (unlock) the locking mechanism. In one embodiment, when the service tool 34 is inserted into the receptacle 10, a distal part 58 of the tool's elongated part 38 faces either an opposite shaft wall, or, when the elevator car 4 is at the floor L1, the elevator car 4. This allows a transducer 56 of the service tool 34 to interact with a detector 28 mounted on the elevator car 4.

In the first state of the elevator installation 1 illustrated in FIG. 1 the elevator car 4 is at about a level of the floor L2 moving downward towards the floor L1, as illustrated by an arrow 26. The car's downward movement may be in response to a floor call entered by the technician 22. A position indicator 24 above the shaft doors 8 on the floor L1 may indicate the position and/or direction of travel of the elevator car 4. While car doors 4*a* are illustrated in FIG. 1, shaft doors on floor L2 are, for illustrative purposes, not shown. In the illustrated embodiment, the detector 28 is mounted on the roof 4*b*. It is contemplated that in another embodiment a detector may be mounted at another location of the elevator car 4, e.g., on a side wall (e.g., in proximity of the roof 4*b* or a bottom of the car 4). It is further contemplated that more than one detector 28 may be mounted to the elevator car 4, e.g., one on or in proximity of the roof 4*b*, and another one on or in proximity of the bottom. For illustrative purposes, FIG. 1 shows the detector 28 mounted on the roof 4*b*, and a further detector 30 at the bottom of the elevator car 4. The detector 30 may be optional and is, therefore, shown with dashed lines. Hereinafter, the technology is described with reference to the detector 28.

In the illustration of FIG. 1, the elevator installation 1 is equipped to operate according to a conventional up/down control system employing floor terminals 6 having up/down buttons to call the elevator car 4 and to enter a passenger's desired direction of travel. Such floor terminals 6 may be installed, for example, in connection with low and mid-rise buildings and/or older elevator installations. Alternatively, the elevator installation 1 may be equipped to operate according to a destination call control system. A destination call control system may be installed, for example, in connection with high-rise buildings.

Referring to additional elevator components shown in FIG. 1, an elevator controller (EC) 14 is coupled to a drive system 12, which is configured to move the elevator car 4 by means of one or more suspension members 18 up and down the shaft 2. The elevator controller 14 includes or is coupled to a call processing unit which processes calls received from the floor terminals 6, a car terminal (not shown), or both. The call processing depends on the kind of control system (up/down control or destination call control) used, and includes, for example, determining the floor L1, L2 where the elevator car 4 is currently positioned and where it is needed next (i.e., the floor L1, L2 a call is entered), determining the destination floor (L1, L2), allocating the call to the elevator car 4, and acknowledging the call. Based on that call processing, the elevator controller 14 controls the drive system 12 to move the elevator car 4 to a boarding floor (L1, L2) and subsequently to the destination floor (L1, L2). Although FIG. 1 shows a traction elevator system, wherein the drive system 12 moves the elevator car 4 by means of one or more suspension members 18, it is contemplated that the technology described herein is equally applicable to other elevator systems, such as hydraulic elevators, and not limit to traction elevator systems.

A communications line 16 couples the elevator controller 14 to the floor terminals 6. The communications line 16 allows the elevator controller 14 to communicate with each one of the floor terminals 6. A communications line 20 couples the elevator controller 14 to the elevator car 4, wherein the communications line 20 allows the elevator controller 14 to communicate with components of the elevator car 4. The communications line 20 allows, e.g., communications between the elevator controller 14 and a car call terminal. The communications line 20 may be integrated into a so-called hanging or travelling cable that connects the elevator car 4 with the elevator controller 14. The communications line 20 is further coupled to a safety circuit 32 which is in FIG. 1 represented by a switch. As is known in the art, the safety circuit 32 must be closed to allow regular operation of the elevator installation 1, accordingly, interrupting/opening the safety circuit 32 disables regular operation. The communications lines 16, 20 may be embodiment as a wired communications bus. Communications over such a communications bus may follow a LON, BACnet or another serial bus protocol. Any other known technology for communications over a wired network may be used.

Figure 2:
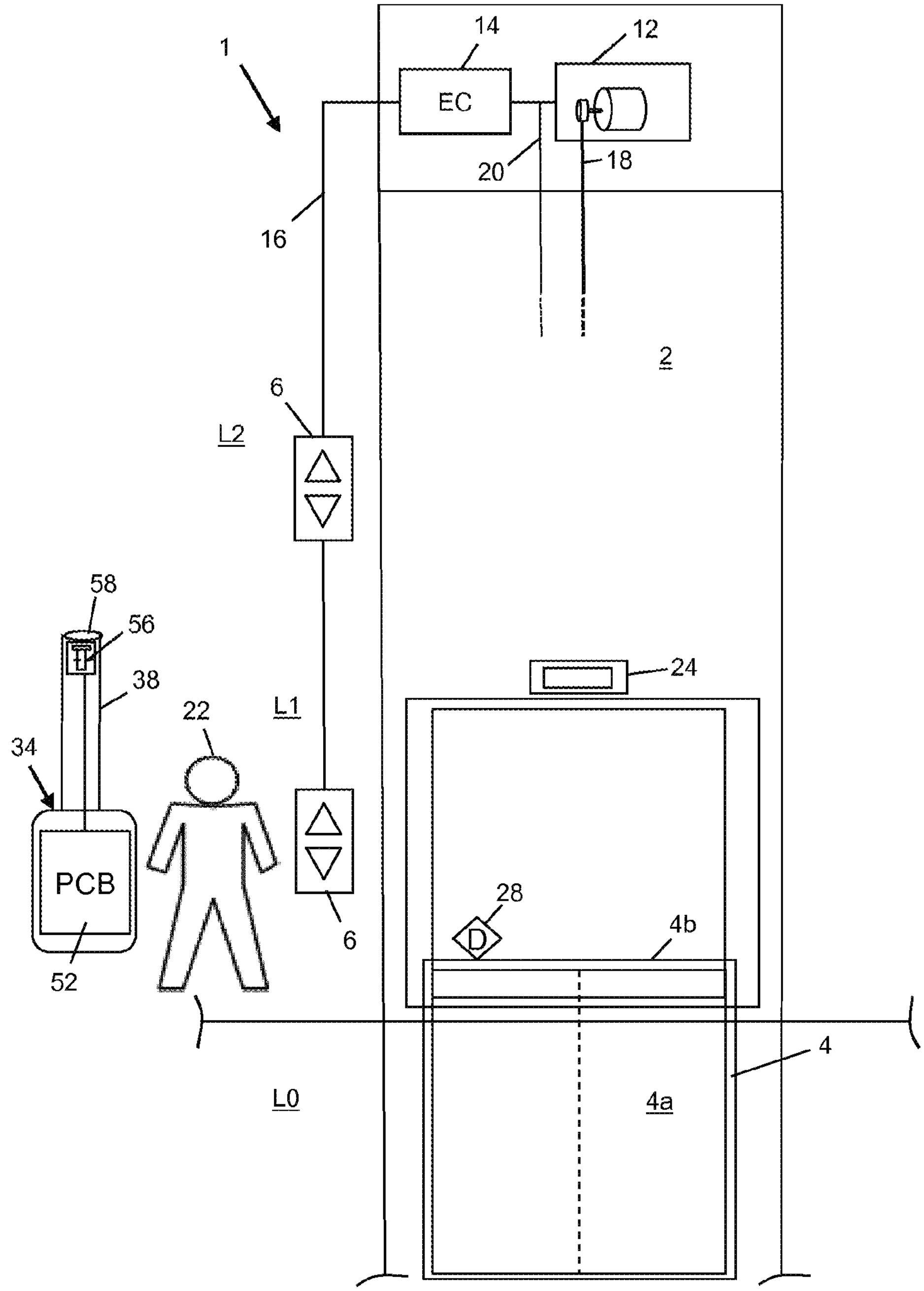
FIG. 2 shows a schematic illustration of the elevator installation of FIG. 1 being in a second state.

Briefly, in the exemplary situation illustrated in FIG. 1, the elevator installation 1 is subject to maintenance by the technician 22. In that situation, the technician 22 is required to get on top of the car's roof 4*b* to perform the maintenance while standing on the roof 4*b*. For safety reasons, the technician 22 is required to follow a defined maintenance protocol or procedure. According to one example of such a maintenance protocol, standing on the floor L1, the technician 22 enters a call at the floor terminal 6 to call the elevator car 4 to the floor L1. In response to that call, the elevator car 4 is moved to the floor L1, as indicated by the arrow 26 in FIG. 1. In case the elevator car 4 is already parked (e.g., in a stand-by mode) at the floor L1, no such movement takes place. Once the elevator doors 8 are open, the technician 22 steps into the elevator car 4, enters via a car terminal a car call to a (destination) floor L0 below the floor L1, and exits the elevator car 4 before the elevator doors 8 close. Standing again on the floor L1, and while the elevator controller 14 initiates the trip to the (destination) floor L0, the technician 22 inserts the service tool 34 into the receptacle 10. While the elevator car 4 moves from the floor L1 downwards towards to floor L0, the tool's transducer 56 and the detector 28 interact, as described below. If that interaction indicates that a distance between the detector 30 and the transducer 56 is equal to a predetermined threshold distance, the drive system 12 is deactivated so that the elevator car 4 comes to a halt within a braking distance. The elevator installation 1 is then in a second state, as illustrated in FIG. 2. The timing of the deactivation is set so that the roof 4*b* of the stopped elevator car 4 is at a level that allows the technician 22 to step on top of the roof 4*b* from the floor L1. From there, the technician 22 may service components mounted on the roof 4*b*, or control the elevator car 4 to move up or down to service components located somewhere else from within the elevator shaft 2.

Figure 3:
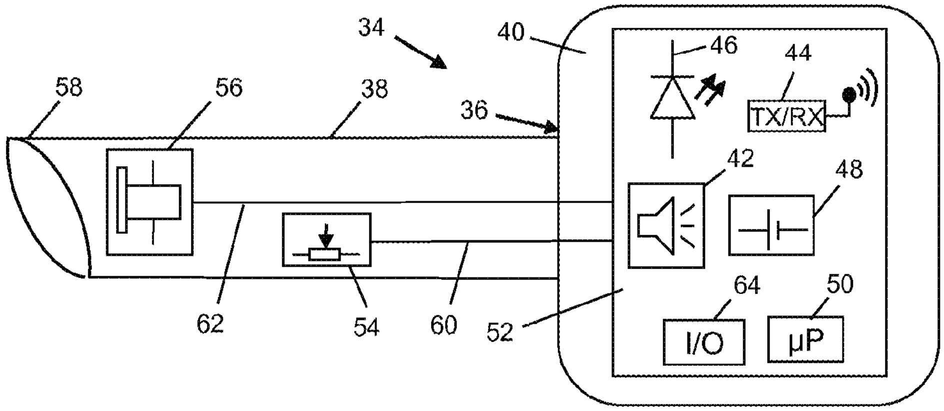
FIG. 3 is a schematic illustration of one embodiment of a service tool.

FIG. 3 is a schematic illustration of one embodiment of the service tool 34, wherein the illustration depicts a side view of the service tool 34. The service tool 34 has a housing 36 formed by the elongated part 38, and a part 40 the technician 22 can hold or grab when handling the service tool 34. The part 40 is herein referred to as grip part 40. It is contemplated that the shape of the service tool 34 is not limited to the shape shown in in FIG. 3, rather, the service tool 34 may have a different shape as long as the technician 22 can handle and insert a part of it into the receptacle 10. In particular the grip part 40 may be shaped depending on size and/or ergonomic requirements. For example, the size is selected to house electronic components, and the ergonomic form is selected to facilitate its handling by the technician 22, e.g., when wearing gloves.

In the embodiment of FIG. 3, the service tool 34 includes various electronic components, such as a processor unit (μP) 50, a battery 48, a transceiver (TX/RX) 44, an on/off switch (I/O) 64, and an indication equipment, such as a sound generator 42 (e.g., including a buzzer or loudspeaker) and/or an optical indicator 46 (e.g., including one or more LEDs). In one embodiment, the processor unit 50 is configured to perform processing tasks, as described herein, to store set operational values, and/or to record events, such as time and duration of tool activation, generation of warning signals, and/or processing results. For these functions, the processing unit 50 may include a storage device. The components may be arranged on a common carrier plate, e.g., a printed circuit board (PCB) 52 positioned within the grip part 40. The transducer 56 and a strain gauge 54 are arranged on or within the elongated part 38, whereas the transducer 56 is arranged at the distal end 58 of the elongated part 38. Conductors 60, 62 connect the strain gauge 54 and the transducer 56, respectively, to the PCB 52. As can be seen from the side view of the exemplary service tool 34 shown in FIG. 3, the distal end 58 has a crescent shape, whereas the elongated part 38 has a circular cross-section. It is contemplated that the service tool 34 may include less than these components, e.g., certain embodiments may not include the transceiver 44, a separate on/off switch 64, and/or the strain gauge 54.

The service tool 34 may be configured for different applications. For example, it may be used to facilitate access to the roof 4*b* of the elevator car, as described herein, e.g., with reference to FIG. 4. It may also be used to allow safe access to the shaft 2, as described herein, e.g., with reference to FIG. 5. In one embodiment, the service tool 34 may, therefore, have additional components, e.g., a selector switch that allows the technician 22 to set the service tool 34 for one of the applications, and/or an additional transducer optimized for one of the applications. For example, the additional transducer may include a proximity detector, a radar detection system, or an optical detection system. The additional transducer may be used for the safe shaft-access application of FIG. 5.

The transducer 56 converts an electrical signal into another physical signal. The transducer 56 may include an infrared (IR) light signal transmitter, a laser signal transmitter, an ultrasonic signal transmitter, or an RF signal transmitter. Depending on its configuration, the transducer 56 may in one embodiment include a proximity detection system, a radar detection system, or an optical detection system. The transducer 56 may be used for the roof-access application of FIG. 4. When activated by the technician 22 via the on/off switch 64, the transducer 56 transmits an IR signal, a laser signal, an ultrasonic signal or an RF signal. The intensity or power of such a transmitted signal is selected for communications over a short distance, e.g., a few meters, e.g., less than about 2 meters. The transducer 56 may be arranged within the distal end 58 so that it transmits its signal in a defined direction. For example, the direction may be defined by an angle with respect to the longitudinal axis of the elongated part 38; the angle may be about 0° or between about 0° and about 90°. The angle may be set to transmit the signal "downwards" so that the detector 28, when positioned to detect in "upward" direction, detects the signal when passing by the detector 28 moving downwards.

Depending on the technology selected for the transducer 56, the detector 28 on the elevator car 4 is compatible with the selected technology. That is, for example, the detector 28 is configured to detect IR light if the transducer 56 transmits IR light. Further, the detector 28 includes an electronic circuit that compares the detected signal (e.g., intensity of the IR light) with a stored threshold value. That functionality may be implemented by a processor and a storage device of the detector 28, wherein the processor generates an output signal depending on the result of the comparison; in one embodiment, the output signal is a YES (1) or NO (0) signal indicating that the threshold value is reached or not reached, respectively. The detector 28 is powered, for example, via the elevator installation's travelling cable.

The transducer 56 and the detector 28 may be viewed as a detection system. The detector 28 detects the transmitted signal when—and as long as—the detector 28 is sufficiently close to the transducer 56. For example, when the elevator car 4 moves from the floor L1 to the lower floor L0, the detector 28 passes by the transducer 56 of the service tool 34 inserted into the receptacle 10. At that time, the detector 28 detects maximal signal intensity, which subsequently decreases with increasing distance between the transducer 56 and the detector 28. At a certain (threshold) distance, however, the detected signal intensity falls below a set threshold value. When that happens, the drive system 12 is deactivated so that the elevator car 4 comes to a halt within a braking distance.

The strain gauge 54 senses pressure or torque applied to the service tool 34, and generates a strain signal indicative of that pressure or torque. The strain signal is fed to the processor unit 50 for further processing. In one embodiment, pressure or torque is applied to the service tool 34 when the technician 22 applies force or pressure to the grip part 40 to rotate the inserted service tool 34 against the resistance of the shaft door's locking mechanism. The strain signal indicates the technician's intent to unlock the shaft door 8.

The transceiver 44 is configured to operate in accordance with one of known technologies for radio communications. These technologies include the Bluetooth, RFID, WLAN/Wi-Fi or cellular mobile communications (e.g., GSM, UMTS, LTE) technologies. The transceiver 44, therefore, may be encompassed by a radio modem configured for one of these technologies. Depending on the implemented technology, the transceiver 44 communicates with a remote receiver that is in the vicinity of the service tool 34 (e.g., a Bluetooth and/or Wi-Fi enabled smartphone carried by the technician 22), or at a remote location (e.g., at an elevator service center). The service tool 34 may transmit one or more messages for various purposes, for example, to allow logging its device identifier and use, or—in case of a hazardous entry into the elevator shaft 2—notifying a supervisor about such entry.

The indication equipment including the sound generator 42 and the indicator 46 provides for acoustic and/or visual notifications of the technician 22. These notifications may indicate various safe and critical situations to the technician 22, e.g., by means of warning signals, as described below with reference to FIG. 4 and FIG. 5.

Figure 4:
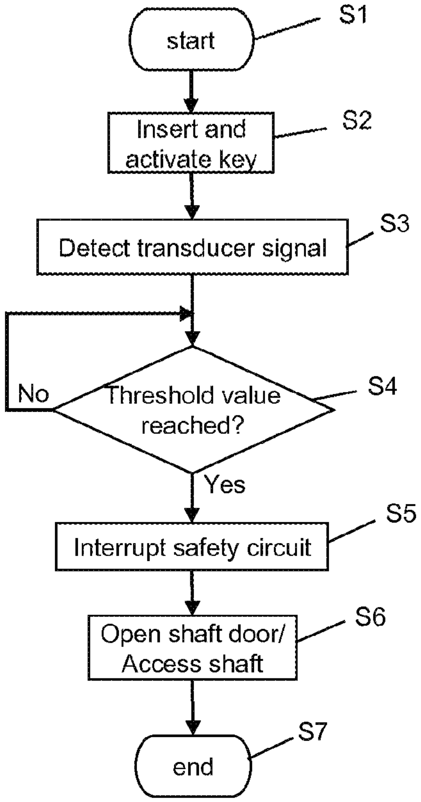
FIG. 4 is a is a flow diagram of one embodiment of a method of operating the elevator installation during maintenance.
Figure 5:
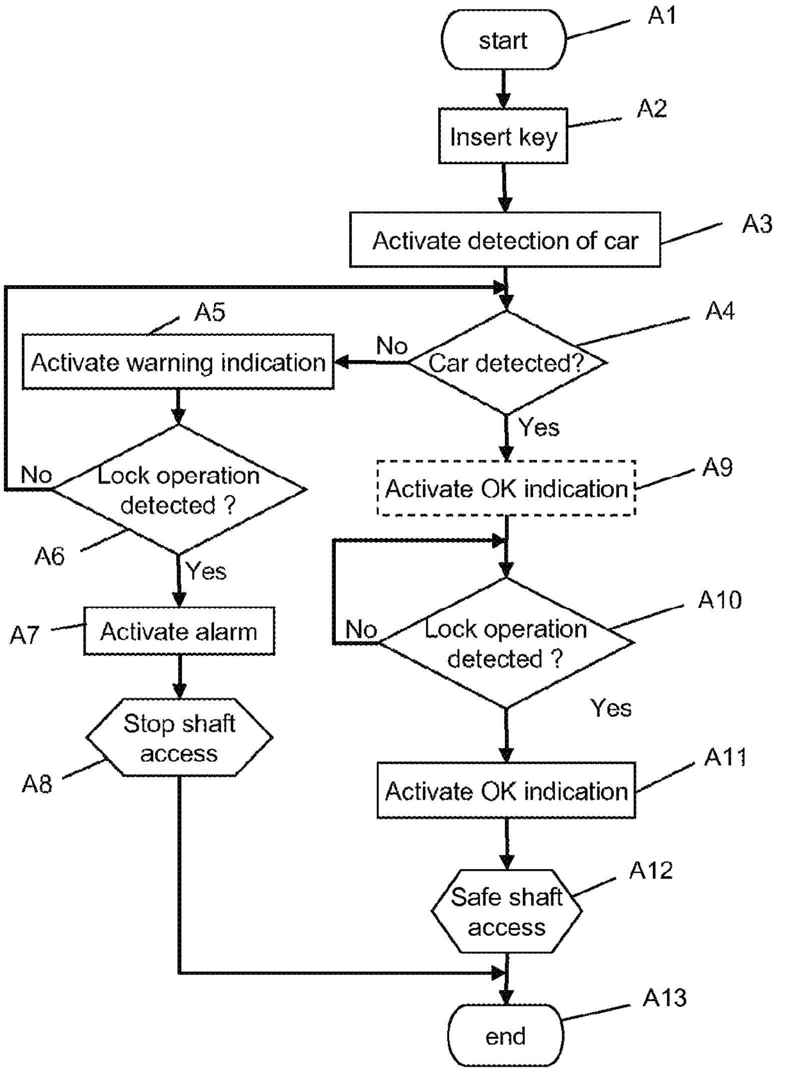
FIG. 5 is a flow diagram of a further embodiment of a method of operating the elevator installation during maintenance.

With the understanding of the general structure and function of the elevator installation 1 and certain features of the service tool 34 described with reference to FIGS. 1-3, a description of how some embodiments of the service tool 34 are used by the technician 22 in conjunction with the elevator installation 1, and how the elevator installation 1 operates during maintenance, follows with reference to FIG. 4 and FIG. 5. One object of the embodiment shown in FIG. 4 is to control the elevator installation 1 so that the car's roof 4*b* comes to a halt at about the level of the floor L1 where the technician 22 is waiting. One object of the embodiment shown in FIG. 5 is to control the elevator installation 1 so that the technician 22 is warned when attempting a hazardous entry into the elevator shaft 2.

FIG. 4 shows a flow diagram of one embodiment of a method of operating the elevator installation 1 during maintenance by the technician 22 to allow the technician 22 to step on top of the roof 4*b*. It is contemplated that in another illustration of the flow diagram some of the shown steps may be merged into a single step, or split into several separate steps. Further, it is contemplated that the technician 22 on floor L1 already initiated the maintenance procedure mentioned above, i.e., the elevator car 4 called by the technician 22 is at the floor L1, and the technician 22 stepped into the elevator car 4 to enter a car call and exited the elevator car 4 before the elevator doors 8 closed. To provide context, some of the illustrated steps are described as performed by the technician 22. It is contemplated, however, that the elevator installation 1 reacts to the technician's acts and executes corresponding tasks. The operational method is, therefore, performed by the elevator installation 1. The exemplary flow diagram starts at a step S1 and ends at a step S7.

Proceeding to a step S2, the technician 22 inserts the service tool 34 into the receptacle 10 of the (closed) shaft door 8 while standing on the floor L1. The technician 22 may activate the service tool 34 prior to or after inserting it. Once activated, the tool's battery 48 provides electrical energy to the various components of the service tool 34. For example, the processor unit 50 may activate the transducer 56, determine if the strain gauge 54 senses pressure or torque, control the sound generator 42 and/or the indicator 46 to indicate activation, and cause the transceiver 44 to transmit a message indication the service tool's use.

Proceeding to a step S3, a transducer signal is detected. That is, the detector 28 detects the signal transmitted by the transducer 56 when—and as long as—the detector 28 is sufficiently close to the transducer 56 while the elevator car 4 moves downwards.

Proceeding to a step S4, the detected signal (i.e., its value of intensity) is compared to a threshold value stored in the detector 28. As long as the threshold value is not reached, e.g., the detected signal's intensity value is higher than the threshold value, the comparing continues, as indicated by the NO branch of step S4. However, when the elevator car 4 is at a certain (threshold) distance from the service tool 34, the detected signal intensity reaches the threshold value and continues to fall below the threshold value. When that happens, the method proceeds along the YES branch to a step S5.

In step S5, the safety circuit 32 is interrupted. In response, the drive system 12 is deactivated and the elevator car 4 comes to a halt within a braking distance. The elevator car 4 may then be positioned as shown in FIG. 2. The braking distance can be determined, for example, for each elevator installation 1 individually. Depending on the braking distance, the timing of the deactivation of the drive system 12 can be determined keeping in mind that the roof 4*b* of the stopped elevator car 4 should be at a level that allows the technician 22 on the floor L1 to step onto the roof 4*b*. The timing may be such that the interruption of the safety circuit 32 occurs at about the time the threshold value is reached. Alternatively, the timing may be such that the interruption of the safety circuit 32 occurs with a delay after the time the threshold value is reached. Other parameters that may be considered when determining the timing include the locations of the detector 28 and the receptacle 10, the kind of transducer 56 used, and the intensity or range of the signal transmitted by the transducer 56.

Proceeding to a step S6, the shaft door 8 is open and the technician 22 can access to the shaft 2 and step onto the roof 4*b*. To open the shaft door 8, the technician 22 turns the service tool 34 to unlock the door's locking mechanism. According to the defined maintenance protocol, the technician 22 may initially open the shaft door 8 only a few centimeters (e.g., 15 cm) to verify and confirm the correct location of the roof 4*b*. Only after that, the technician 22 opens the shaft door 8, steps onto the roof 4*b*, and starts performing any intended maintenance. The flow diagram ends at step S7.

Depending on the configuration of the service tool 34, one or more of the events, such as activation of the service tool 34, may be recorded either within the service tool 34 and/or transmitted to a remote receiver (e.g., carried by the technician 22 or located at a service center).

FIG. 5 shows a flow diagram of one embodiment of a method of operating the elevator installation 1 during maintenance by the technician 22 to provide for safe shaft access. It is contemplated that in another illustration of the flow diagram some of the shown steps may be merged into a single step, or split into several separate steps. To provide context, some of the illustrated steps are described as performed by the technician 22. It is contemplated, however, that the elevator installation 1 reacts to the technician's acts and executes corresponding tasks. The operational method is, therefore, performed by the elevator installation 1. The exemplary flow diagram starts at a step A1 and ends at a step A13.

Proceeding to a step A2, the technician 22 inserts the service tool 34 into the receptacle 10 of the shaft door 8 while standing at the floor L1. The technician 22 may activate the service tool 34 prior to or after inserting it. Once activated, the tool's battery 48 provides electrical energy to the various components of the service tool 34, as described with respect to step S2 of FIG. 4.

Proceeding to a step A3, detection of the elevator car 4 is activated. That is, the processor unit 50 activates the transducer 56 to determine if the elevator car 4 is at the floor L1 (i.e., "behind" the closed shaft door 8). The transducer 56 may include a proximity detection system, a radar detection system, or an optical detection system. These kinds of detectors detect whether an object (i.e., the elevator car 4) is present, for example, by generating a signal when an object is close (e.g., when using a proximity or radar detector) or when an object interrupts a light path (e.g., when using an optical detector in combination with a light source).

As used herein, the term "present" is to be understood that at least some part of the elevator car 4 is at a certain floor L0, L1, L2, for example, behind a closed shaft door 8. For example, the roof 4*b* may be somewhat level with the floor L0, L1, L2.

Proceeding to a step A4, it is determined if the elevator car 4 is positioned at the floor L1. If it is, the transducer 56 generates a signal that is fed to the processor unit 50. The processor unit 50 determines if the generated signal is indicative of the elevator car's presence. The method proceeds along the YES branch to a step A9. If it is determined that the elevator car 4 is not present, the method proceeds along the NO branch to a step A5.

In step A5, a warning indication is activated. The warning indication is a first indication signal that indicates a first warning level to the technician 22. For example, the processor unit 50 activates the sound generator 42 and/or the indicator 46 to indicate to the technician 22 that the elevator car 4 is not present at the floor L1 and that the technician 22 must, for example, wait.

Proceeding to a step A6, it is determined if a lock operation is detected. A lock operation occurs when the technician 22, for example, rotates the service tool 34 to unlock the shaft door 8. In that case, the strain detector 54 is subject to strain (pressure or torque) that results in a change of an electrical characteristic (e.g., resistance) which the processor unit 50 detects. If no lock operation is detected, the method loops back along the NO branch to step A4. If, however, a changing electrical characteristic indicates a lock operation, the method proceeds along the YES branch to a step A7.

In step A7, an alarm is activated. The alarm is a second indication signal indicating a second warning level to the technician 22. The processor unit 50 activates the sound generator 42 and/or the indicator 46 to warn the technician 22 about a dangerous situation, i.e., the elevator car 4 is not present at the floor L1 while the technician 22 attempts to access the shaft 2. To distinguish between the warning indication of step A5 and the alarm of step A7, the alarm may sound louder and/or have a different sound pattern, and/or the indicator 46 may emit light having a different color and/or pattern. As indicated in step A8, the technician 22 may be instructed to stop access to the shaft 2 when the alarm is activated. In one embodiment, the transceiver 44 may transmit a message for recording the attempted dangerous shaft access. The method proceeds to step A13 and ends.

Referring again to step A4, the method proceeds along the YES branch to step A9 if the elevator car 4 is positioned at the floor L1. In step A9, an OK indication is activated corresponding to a fourth indication signal. For that purpose, the processor unit 50 activates the indicator 46, for example, to emit a constant green light (or any other color that is usually not perceived as indicating danger or a warning (e.g., red)). Depending on the warning scheme defined for the maintenance procedure (e.g., warn only of critical or dangerous situations), step A9 may be optional.

Proceeding to a step A10, it is determined if a lock operation is detected. This determination is as described with respect to step A6. As long as there is no lock operation detected, the method loops back along the NO branch to step A10. If, however, a lock operation is detected, the method proceeds along the YES branch to a step A11.

In step A11, an OK indication is activated. As a third indication signal it indicates a safe state to the technician if applied force is detected and the elevator car 4 is present at the first floor L1. For that purpose, the processor unit 50 activates the indicator 46, as described with respect to step A9.

Proceeding to a step A12, the technician 22 may initially open the shaft door 8 only a few centimeters (e.g., 15 cm) to verify and confirm that the elevator car 4 is present. Only after that, the technician 22 opens the shaft door 8, and starts performing any intended maintenance. The flow diagram ends at step A13.

The generation of the indication signal may be recorded in a storage device. The storage device may be arranged within the service tool 34, or at a remote device. The remote device may be the technician's mobile phone, or provided at a service center. In case of a remote device, the transceiver 44 may send a notification signal to the remote device. The notification signal may include information about the event and the time the event occurred.

The invention claimed is:

1. A method of operating an elevator installation for maintenance by a technician, wherein the technician is stands on top of a roof of an elevator car, the method comprising:

operating a drive system to move the elevator car along an elevator shaft in response to a call entered by the technician on a first floor; and deactivating the drive system in response to a control signal generated by an elevator controller when a safety circuit of the elevator installation is interrupted, wherein interrupting the safety circuit is caused by a detector mounted on the elevator car detecting a signal transmitted by a service tool and having an intensity value that is below a predetermined threshold value, wherein the service tool is introduced into a receptacle of a shaft door at the first floor, and wherein after deactivation of the drive system, the moving elevator car comes to a halt with its roof being at a level to allow the technician to step on top of the roof from the first floor.

2. The method of claim 1, wherein operating the drive system to move the elevator car comprises moving the elevator car from the first floor downwards.

3. The method of claim 1, wherein the call entered by the technician comprises a car call from within the elevator car.

4. The method of claim 1, wherein interrupting the safety circuit occurs at substantially the same time the detector detects that the intensity value of the transmitted signal is about equal to the predetermined threshold value.

5. The method of claim 1, wherein interrupting the safety circuit occurs with a predetermined delay time after the detector detects that the intensity value of the transmitted signal is about equal to the predetermined threshold value.

6. An elevator installation comprising:

an elevator controller;

a drive system;

an elevator car coupled to the drive system and movable under control of the elevator controller within an elevator shaft between floors of a building, wherein a shaft door is provided on each floor and includes a receptacle to receive a service tool of a technician;

a safety circuit coupled to the elevator controller; and a detector mounted at the elevator car and coupled to the safety circuit, wherein the elevator controller is configured to:

operate the drive system to move the elevator car along the elevator shaft in response to a call entered by the technician on a first floor; and deactivate the drive system in response to a control signal generated by the elevator controller when the safety circuit is interrupted, wherein interrupting the safety circuit is caused by the detector detecting a signal transmitted by the service tool positioned at the receptacle of the shaft door of the first floor and having an intensity value that below a predetermined threshold value, and wherein after deactivation of the drive system the moving elevator car comes to a halt with a roof being at a level to allow the technician to step on top of the roof from the first floor.

7. The elevator installation of claim 6, wherein the detector is mounted on the roof or at a side wall in proximity of the roof.

8. The elevator installation of claim 6, wherein the detector is mounted at a bottom of the elevator car or at a side wall in proximity of the bottom.

9. The elevator installation of claim 6, wherein the elevator controller generates the control signal in response to the detector causing a braking of the safety circuit of the elevator installation.

10. The elevator installation of claim 6, wherein the receptacle is arranged on a door panel of the shaft door or at a door frame of the shaft door.

11. The elevator installation claim 6, wherein the detector is configured to detect at least one of: an IR signal, a laser signal, an ultrasonic signal, and an RF signal.

12. An elevator service tool comprising:

a housing having an elongated part and a grip part, the elongated part configured to be introduced into a receptacle of a shaft door of a first floor of an elevator installation;

a processor, a battery, and an indicator equipment arranged within the grip part; and a transducer arranged at a distal end of the elongated part, the transducer configured to deactivate a drive system of the elevator installation in response to a control signal generated by an elevator controller when a safety circuit is interrupted, wherein interrupting the safety circuit is caused by the detector detecting a signal transmitted by the transducer positioned at the receptacle of the shaft door of the first floor and having an intensity value that below a predetermined threshold value, and wherein after deactivation of the drive system the moving elevator car comes to a halt with a roof being at a level to allow the technician to step on top of the roof from the first floor.

13. The service tool of claim 12, further comprising a strain gauge arranged on or within the elongated part configured to detect rotation of the service tool by the technician.

14. The service tool of claim 12, further comprising an RF transceiver arranged within the grip part configured to communicate with a device external to the service tool.

15. The service tool of claim 12, wherein the transducer includes at least one of an IR signal transmitter, a laser transmitter, an ultrasonic signal transmitter, and an RF signal transmitter.

* * * * *